(12) United States Patent
Nakano et al.

(10) Patent No.: US 9,088,196 B2
(45) Date of Patent: Jul. 21, 2015

(54) MOTOR DRIVE DEVICE FOR ELECTRIC POWER STEERING APPARATUS

(75) Inventors: Masatsugu Nakano, Tokyo (JP); Satoru Akutsu, Tokyo (JP); Yoshihito Asao, Tokyo (JP)

(73) Assignee: Mitsubishi Electric Corporation, Tokyo (JP)

( * ) Notice: Subject to any disclaimer, the term of this patent is extended or adjusted under 35 U.S.C. 154(b) by 209 days.

(21) Appl. No.: 13/979,920

(22) PCT Filed: May 20, 2011

(86) PCT No.: PCT/JP2011/061651
§ 371 (c)(1),
(2), (4) Date: Jul. 16, 2013

(87) PCT Pub. No.: WO2012/160622
PCT Pub. Date: Nov. 29, 2012

(65) Prior Publication Data
US 2013/0300222 A1 Nov. 14, 2013

(51) Int. Cl.
H02K 11/00 (2006.01)
H02K 9/22 (2006.01)
H02K 5/02 (2006.01)
H02K 3/50 (2006.01)
H02K 7/116 (2006.01)

(52) U.S. Cl.
CPC ............ *H02K 11/0084* (2013.01); *H02K 3/50* (2013.01); *H02K 5/02* (2013.01); *H02K 7/1166* (2013.01); *H02K 9/22* (2013.01); *H02K 11/0015* (2013.01); *H02K 11/0073* (2013.01); *H02K 2213/03* (2013.01)

(58) Field of Classification Search
USPC .................. 310/64, 68 B, 68 D, 68 R, 71, 89
See application file for complete search history.

(56) References Cited

U.S. PATENT DOCUMENTS

| | | | | |
|---|---|---|---|---|
| 6,268,669 | B1 * | 7/2001 | Wakao et al. ............... | 310/67 R |
| 6,577,030 | B2 * | 6/2003 | Tominaga et al. .......... | 310/68 B |
| 6,864,605 | B2 * | 3/2005 | Shimizu et al. ............ | 310/68 R |
| 7,932,651 | B2 * | 4/2011 | Fujimoto et al. ............... | 310/71 |
| 2002/0060105 | A1 | 5/2002 | Tominaga et al. | |
| 2007/0063596 | A1 * | 3/2007 | Akutsu et al. ............... | 310/68 B |
| 2008/0017438 | A1 * | 1/2008 | Kanda et al. .................. | 180/443 |

(Continued)

FOREIGN PATENT DOCUMENTS

| | | | |
|---|---|---|---|
| JP | 3560701 B2 | 9/2004 | |
| JP | 3774624 B2 | 5/2006 | |

(Continued)

*Primary Examiner* — Thanh Lam
(74) *Attorney, Agent, or Firm* — Sughrue Mion, PLLC; Richard C. Turner (57) ABSTRACT

A motor drive device employed, for example, in an electric power steering apparatus for vehicle, achieves a reduction not only in size but also in vibration and noise at the same time. At least one of a motor drive control unit (30) and a motor (10) is provided with at least two screw holes (53) for fixation to a gear (speed reducer) of an electric power steering apparatus. Let L1 be a maximum value of a distance between center points of the screw holes (53) and L2 be a distance between an end face (D) of a stator iron core (12) in an axial direction on a farther side from the gear and an attachment surface (C) attached to a gear side, then a value of L1 is equal to or greater than a value of L2.

13 Claims, 10 Drawing Sheets

(56) References Cited

U.S. PATENT DOCUMENTS

2010/0288577 A1   11/2010  Sonoda et al.
2010/0327680 A1*  12/2010  Miyachi et al. ............... 310/71
2011/0285226 A1*  11/2011  Fujita et al. .................... 310/71
2013/0249356 A1*   9/2013  Nakano et al. ............. 310/68 D

FOREIGN PATENT DOCUMENTS

| | | |
|---|---|---|
| JP | 2010-226907 A | 10/2010 |
| JP | 2010-280245 A | 12/2010 |
| WO | 2009/125506 A1 | 10/2009 |

* cited by examiner

MOTOR DRIVE DEVICE FOR ELECTRIC POWER STEERING APPARATUS

CROSS REFERENCE TO RELATED APPLICATIONS

This application is a National Stage of International Application No. PCT/JP2011/061651 filed May 20, 2011, the contents of all of which are incorporated herein by reference in their entirety.

TECHNICAL FIELD

The present invention relates to a motor drive device employed in an electric power steering apparatus for vehicle, and more particularly, to a motor drive device of an integral type combining a motor drive control unit.

BACKGROUND ART

There is a column electric power steering apparatus described, for example, in PTL 1. Further, for the electric power steering apparatus, there is proposed an integral-type structure in which a motor and a motor drive control unit are combined into one piece (PTL 1, PTL 2, and PTL 3).

The device can be smaller when adopting the integral-type structure in which a motor and a motor drive control unit are combined into one piece.

CITATION LIST

Patent Literature

PTL 1: JP-A-11-11329
PTL 2: JP-A-2010-28925
PTL 3: JP-A-2002-120739

SUMMARY OF INVENTION

Technical Problem

The structure of PTL 1, however, has a problem that ease of mounting becomes poor when the motor has a long shaft length and, moreover, a space surrounding a transmission mechanism, such as a worm gear, cannot be utilized effectively. In addition, this structure has another problem with a motor having a long motor shaft length that the center of gravity of the motor is at a position away from the transmission mechanism, such as a worm gear, which is disadvantageous in terms of vibration and noise.

On the other hand, according to the structure of PTL 2 and PTL 3 combining the motor and the motor drive control unit into one piece, although the drive control unit is disposed coaxially with the motor, the full length becomes long because the drive control unit has a long shaft length and is disposed on the gear side. The center of gravity of the motor is therefore at a position further away from the transmission mechanism, such as a worm gear. Hence, there is a problem that this structure is disadvantageous in terms of vibration and noise.

The invention was devised to solve the problems discussed above and has an object to provide a motor drive device for electric power steering apparatus achieving a reduction not only in size but also in vibration and noise at the same time.

Solution to Problem

A motor drive device for electric power steering apparatus of the invention is a motor drive device for electric power steering apparatus, including a motor having a stator iron core, a frame fixing the stator iron core, and a rotor iron core fixed to a shaft supported in a rotatable manner, and a motor drive control unit disposed coaxially with the shaft and combined with the motor into one piece. At least two screw holes for fixation to a gear (speed reducer) of the electric power steering apparatus are provided to either one of the motor drive control unit and the motor. Herein, let L1 be a maximum value of a distance between center points of the screw holes, and L2 be a distance between an end face of the stator iron core in an axial direction on a farther side from the gear and an attachment surface attached to a gear side, then a value of L1 is equal to or greater than a value of L2.

Advantageous Effects of Invention

According to the motor drive device for electric power steering apparatus of the invention, the motor drive device is of an integral-type configuration that combines the coaxially disposed motor drive control unit and yet can be shaped flat and shorter in the axial direction than the device in the related art. Hence, there can be achieved an advantage that not only can a space surrounding the gear be utilized effectively, but also ease of mounting can be enhanced.

Further, in spite of the integral-type configuration that combines the coaxially disposed motor drive control unit, positions of the center of gravity of the stator iron core and the rotor iron core both having a large mass can be moved closer to the gear of the electric power steering apparatus. Hence, there can be achieved another advantage that vibration and noise can be reduced.

DESCRIPTION OF EMBODIMENTS

First Embodiment

Figure 1:
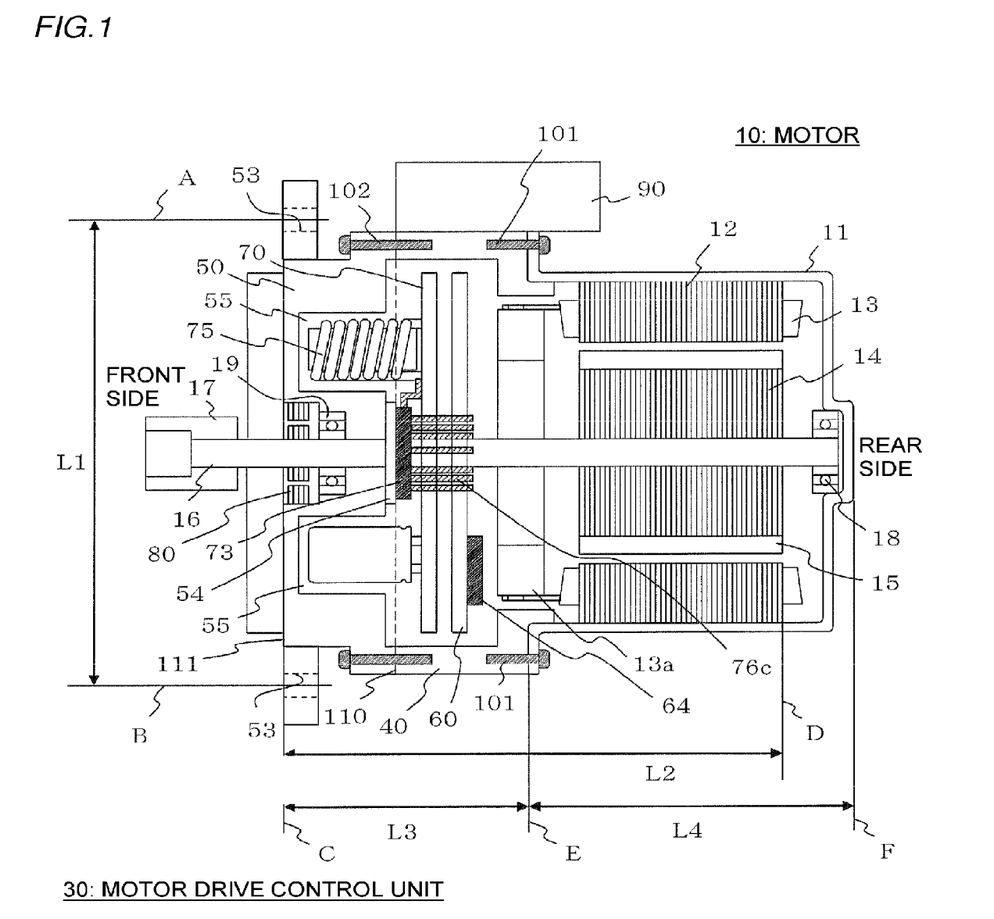
FIG. 1 is a schematic cross section of a motor drive device according to a first embodiment of the invention.

FIG. 1 is a schematic cross section of a motor drive device according to a first embodiment of the invention. The motor drive device includes a motor 10 and a motor drive control unit 30 disposed on a front side (motor output shaft side) of the motor 10 and combined with the motor 10 into one piece.

In the motor drive control unit 30, a connector 90 receives a power supply and predetermined information, such as information on a steering torque and a vehicle speed, in the form of electric signals, which are sent to an electric connection portion 70 and a control board 60. Smoothing capacitors 74 and a coil 75 are embedded in concave holes 55 provided to a heat sink 50. The heat sink 50 and a housing 40 are connected with screws 102 and the housing 40 and a frame 11 of the motor 10 are connected with screws 101. It should be noted that the housing 40 and the heat sink 50 are made of metal and an aluminum die casting material is suitable.

A structure of the motor 10 will be descried in the following. An armature winding 13 is wound around a stator iron core 12 and a rotor including a rotor iron core 14 and a permanent magnet 15 is disposed oppositely to the stator iron core 12. A shaft 16 is press-fit into the center of a rotation shaft of the rotor iron core 14. A boss 17, which is a coupling to a shaft of a gear (speed reducer) of an electric power steering apparatus, is press-fit to one end of the shaft 16. The shaft 16 has a structure by which the shaft 16 is supported on two bearings 18 and 19 and allows the rotor to rotate. One of the bearings 18 and 19 is fixed to the heat sink 50 of the motor drive control unit 30 and the other is fixed to the frame 11. As a sensor that detects a rotation angle of the motor 10, a resolver (rotation sensor) 80 of a variable reluctance type is provided on a front side of the heat sink 50. The stator iron core 12 is fixed to the frame 11 by press-fitting or shrink fitting. The frame 11 is fixed to the housing 40. The armature winding 13 is electrically connected to a bus bar (not shown) via a terminal 13a and electrically connected to the motor drive control unit 30 via the bus bar. The bus bar can drive the motor 10 when supplied with a current from switching elements 73 of the motor drive control unit 30.

Figure 2:
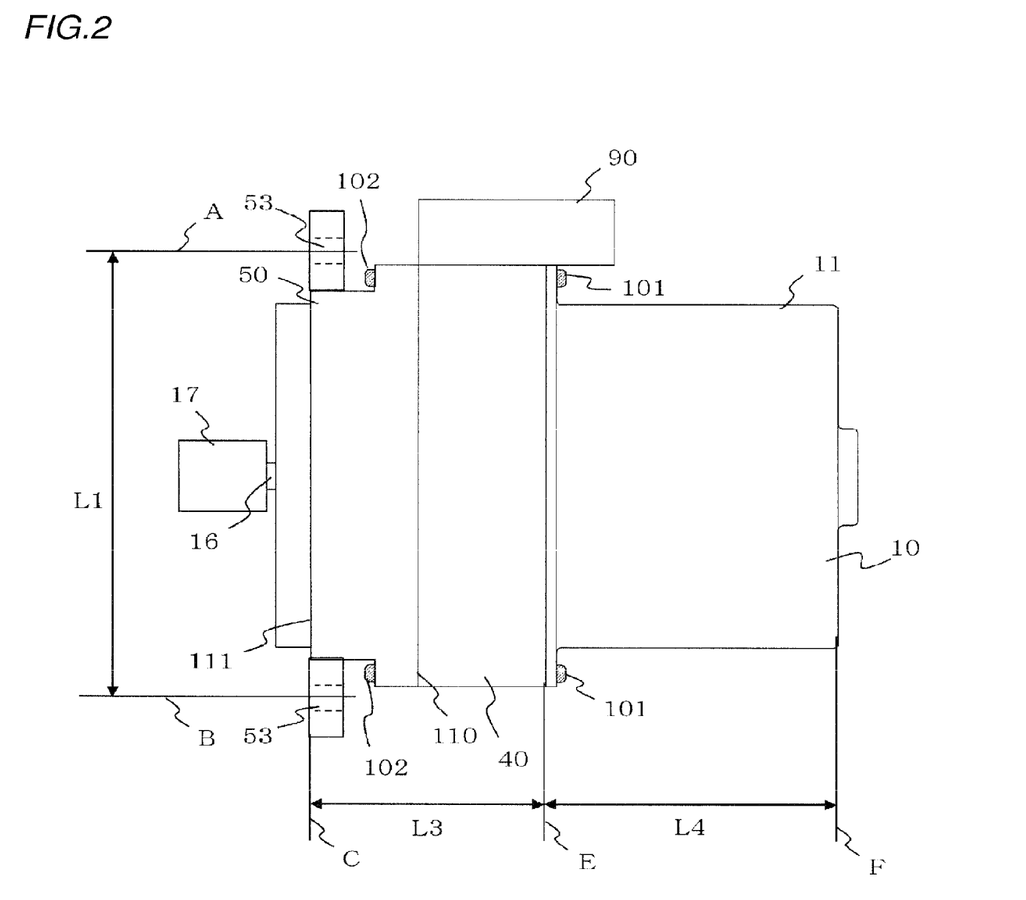
FIG. 2 is a side view of the motor drive device according to the first embodiment of the invention.

FIG. 2 is a side view of the motor drive device of the first embodiment and shows an outward appearance of the motor drive control unit 30 disposed on the front side and combined with the motor 10 into one piece and the motor 10. The frame 11 of the motor 10 is fixed to the housing 40 of the motor drive control unit 30 with the screws 101 and further the housing 40 and the heat sink 50 are fixed with the screws 102.

Figure 3:
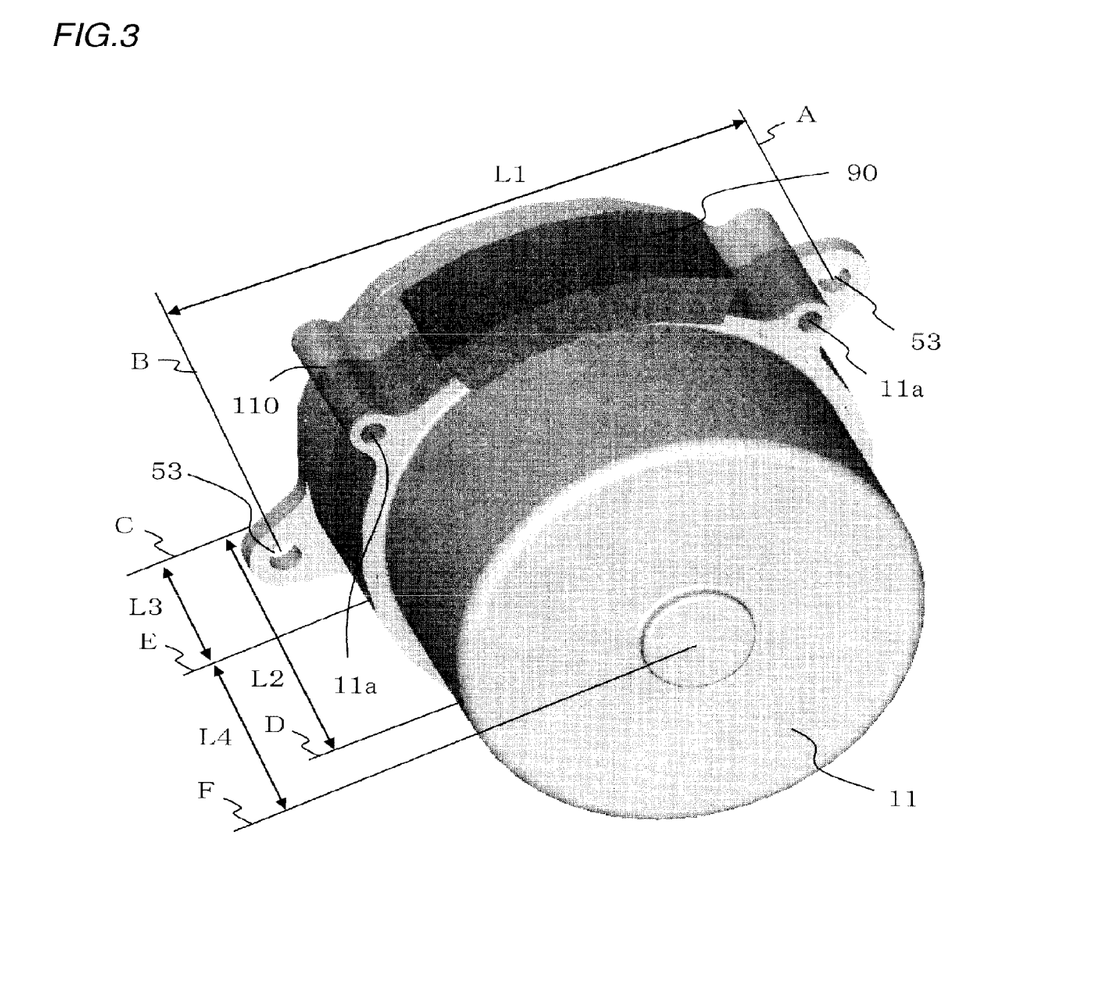
FIG. 3 is an outward appearance perspective view of the motor drive device according to the first embodiment of the invention.

FIG. 3 is an outward perspective view of the motor drive device of the first embodiment and shows a perspective view of the motor 10 and the motor drive control unit 30 disposed on the front side of the motor 10 and combined with the motor 10 in one piece. For ease of illustration, a detailed structure in a portion of the connector 90 is omitted in FIG. 3 and the screws fastening the frame 11, the housing 40, and the heat sink 50 are also omitted. The portion of the connector 90 is provided with a power supply connector and a control signal connector (not shown in detail in the drawing).

The cup-like frame 11 that fixes the stator iron core 12 of the motor 10 by press-fitting has a shape expanding radially outward in the vicinity of a contact surface with the housing 40. The frame 11 includes screw holes 11a in the expanded portions at three points in a circumferential direction and is fastened to the housing 40 with three screws (not shown). Further, it is structured in such a manner that an abutment surface 110 of the housing 40 and the heat sink 50 is on a single plane crossing a direction of the rotation shaft of the motor 10. It is structured in such a manner that screw holes to let the screws used to fasten the frame 11 of the motor 10, the housing 40, and the heat sink 50 pass through are at positions coinciding with one another in the circumferential direction. Also, the heat sink 50 is provided with screw holes 53 used to fasten the heat sink 50 to the gear side of the electric power steering apparatus. In FIG. 3, the screw holes 53 are provided at opposing positions apart by 180 degrees or substantially 180 degrees in a one-to-one correspondence.

It should be appreciated, however, that two or more screw holes 53 may be provided when the need arises.

The structures of the housing 40 and the heat sink 50 will be described in detail below.

As are shown in FIG. 1 through FIG. 3, the heat sink 50 of the motor drive control unit 30 is provided with two screw holes 53 for fixation to the gear of the electric power steering apparatus. Let L1 be a distance between the center points of the screw holes 53. In FIG. 1, given that a straight line A is a straight line passing a center point of the screw hole 53 provided on the upper side of the sheet surface and parallel to the shaft 16 of the motor 10 and a straight line B is a straight line passing a center point of the screw hole 53 provided on the lower side and parallel to the shaft 16 of the motor 10, then L1 is a distance between these straight lines. A plane C of FIG. 1 is a plane that coincides with an abutment surface 111 of the gear of the electric power steering apparatus and the heat sink 50 and a plane D is a plane that coincides with an end face of the stator iron core 12 on the rear side. It is configured in such a manner that let L2 be a distance between the plane C and the plane D, then a value of L1 is equal to or greater than a value of L2.

Further, a plane E that coincides with an abutment surface of the frame 11 and the housing 40 and a plane F on the rear side of the motor 10 are defined. It is also configured in such a manner that let L3 be a distance between the plane C and the plane E and L4 be a distance between the plane E and the plane F, then a value of L3 is equal to or greater than a value of L4.

Figure 4:
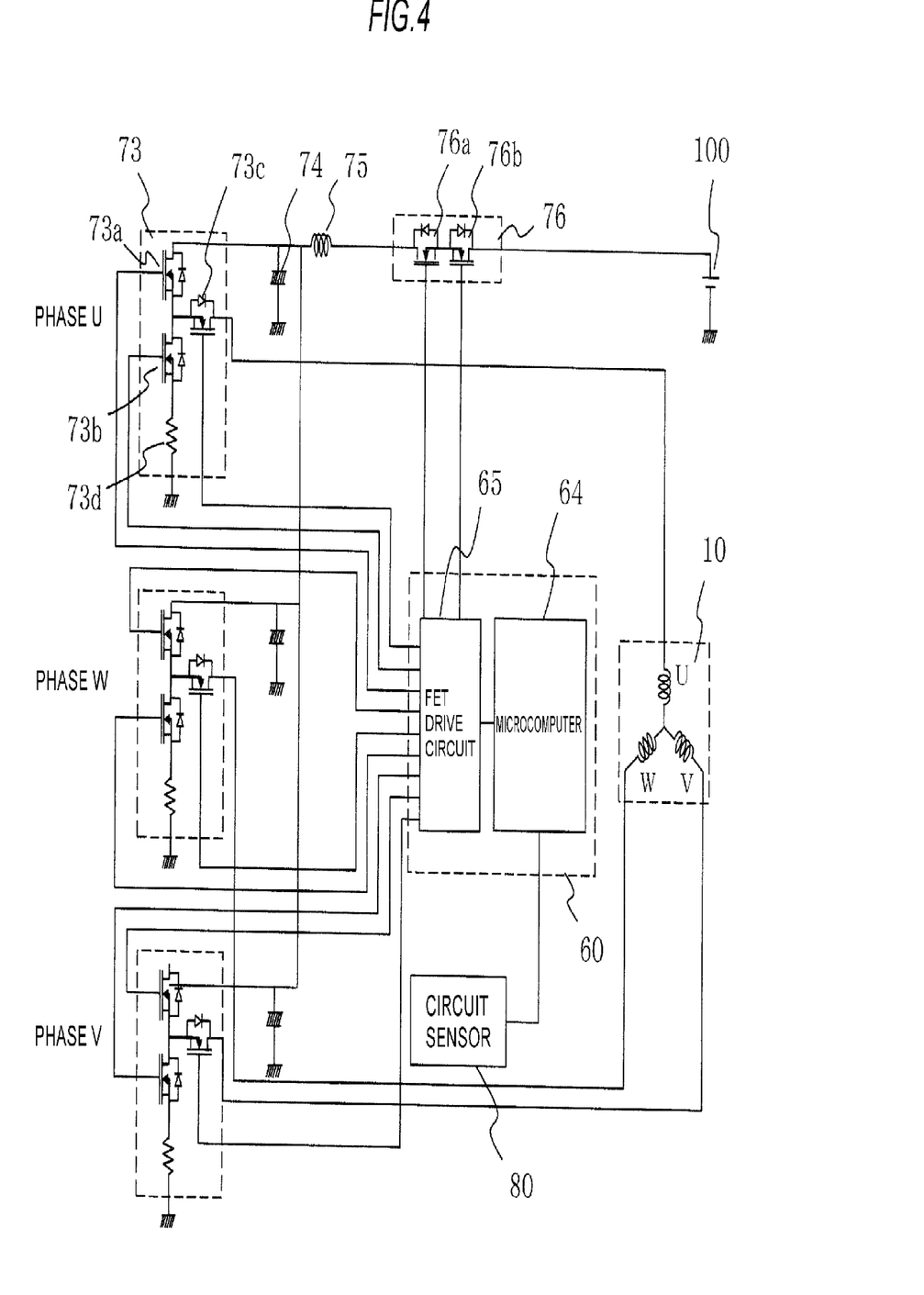
FIG. 4 is a circuit diagram of the motor drive device according to the first embodiment of the invention.

FIG. 4 is a circuit diagram of the motor drive control unit 30. Hereinafter, a manner of connection for the respective portions of FIG. 1 will be described using FIG. 4. The armature winding 13 of the motor 10 is wye-connected. Of FETs 73a and 73b installed in a switching element 73 and connected to each other at one end, the FET 73a forms a plus-side arm of a phase U of a three-phase bridge circuit and the other FET 73b forms a minus-side arm of the phase U. Also, the other end of the FET 73a is connected to the smoothing capacitor 74 for ripple absorption and to the coil 75 for noise absorption. The other end of the FET 73b is connected to a ground potential portion of a vehicle via a shunt resistor 73d. A connection point connecting one ends of the respective FETs 73a and 73b is used as a U-phase AC-side terminal of the three-phase bridge circuit. Also, another FET 73c installed in the switching element 73 is connected to the U-phase AC-side terminal at one end and connected to a U-phase terminal of the armature winding 13 at the other end.

A phase W and a phase V are of the same configuration.

Two FETs 76a and 76b installed in a power supply relay 76 are connected to each other at one end. The other end of the FET 76a is connected to a plus-side DC terminal of the three-phase bridge circuit via the coil 75 and the other end of the other FET 76b is connected to an in-vehicle battery 100 via a power supply connector. FIG. 4 shows a case where the power supply relay 76 is disposed at a position between the battery 100 and the coil 75. It should be appreciated, however, that the power supply relay 76 may be disposed at a position between the coil 75 and the smoothing capacitor 74 instead.

It is configured in such a manner that an FET drive circuit 65 is mounted on the control board 60 and an output terminal thereof is connected to gates of the respective FETs specified above, so that a gate drive signal is given to the respective gates at predetermined timings. A microcomputer 64 mounted on the control board 60 controls the output timing of a gate drive signal outputted from the FET drive circuit 65 according to a rotation detection signal from the resolver 80 serving as the rotation sensor described above.

In a case where the motor drive device according to the first embodiment of the invention configured as above is employed in an electric power steering apparatus, when a steering torque is applied on the steering shaft as a driver operates the steering wheel, an unillustrated torque detection device detects the steering torque and inputs the detection result into the microcomputer 64. Also, a rotation detection signal corresponding to a steering rotation number detected by the resolver 80 serving as the rotation sensor is inputted into the microcomputer 64. The microcomputer 64 computes an assist torque on the basis of the steering torque, steering rotation number, vehicle speed signals, and the like inputted therein, and controls the three-phase bridge circuit, which is a motor drive circuit, in such a manner that the motor 10 generates a torque to apply the assist torque to the steering shaft via the speed reducer.

More specifically, the FET drive circuit 65 generates a gate drive signal at predetermined timing according to a command from the microcomputer 64 and controls conduction of the respective FETs forming the three-phase bridge circuit. Accordingly, the three-phase bridge circuit generates a predetermined three-phase AC current and supplies the three-phase AC current to the armature winding 13 of the motor 10 to drive the motor 10. A torque generated by the motor 10 is applied to the steering shaft via the speed reducer as an assist torque. Hence, a steering force of the steering wheel by the driver is reduced. The above has described a case where the motor 10 is wye-connected. It should be appreciated, however, that it goes without saying that the motor 10 can be delta-connected instead.

The structure of the motor drive control unit 30 will now be described in detail.

Figure 5:
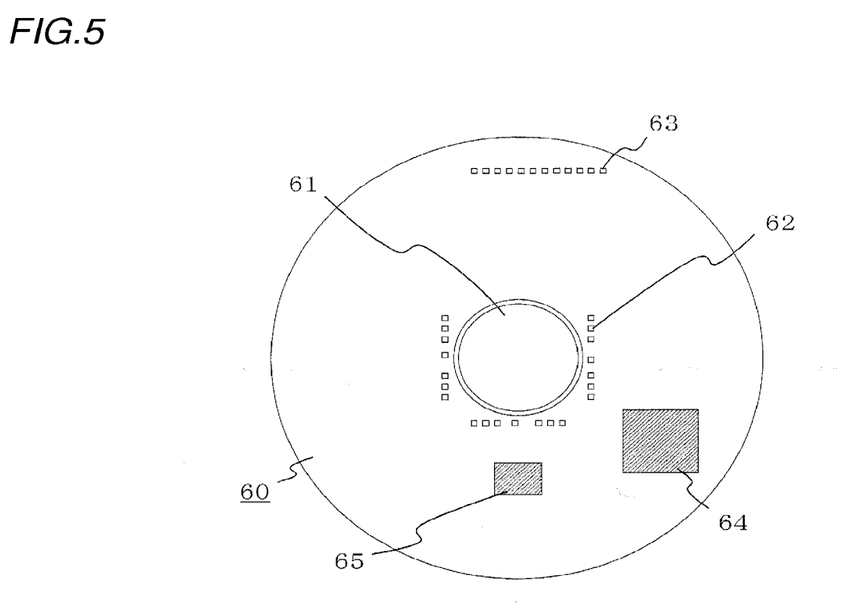
FIG. 5 is a plan view of a control board of a motor drive control unit according to the first embedment of the invention.
Figure 6:
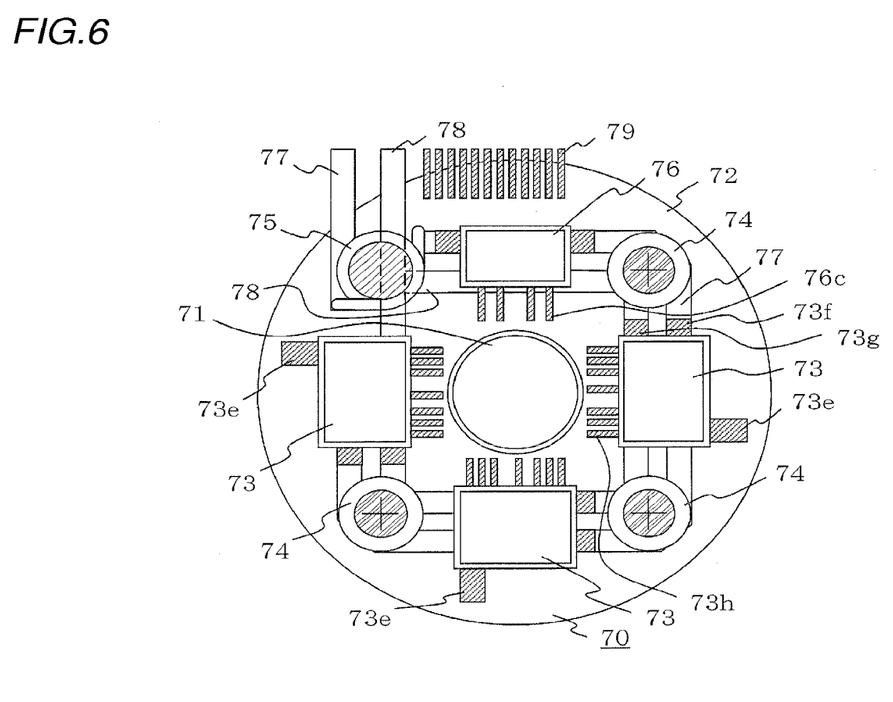
FIG. 6 is a plan view of an electric connection portion of the motor drive control unit according to the first embodiment of the invention.
Figure 7:
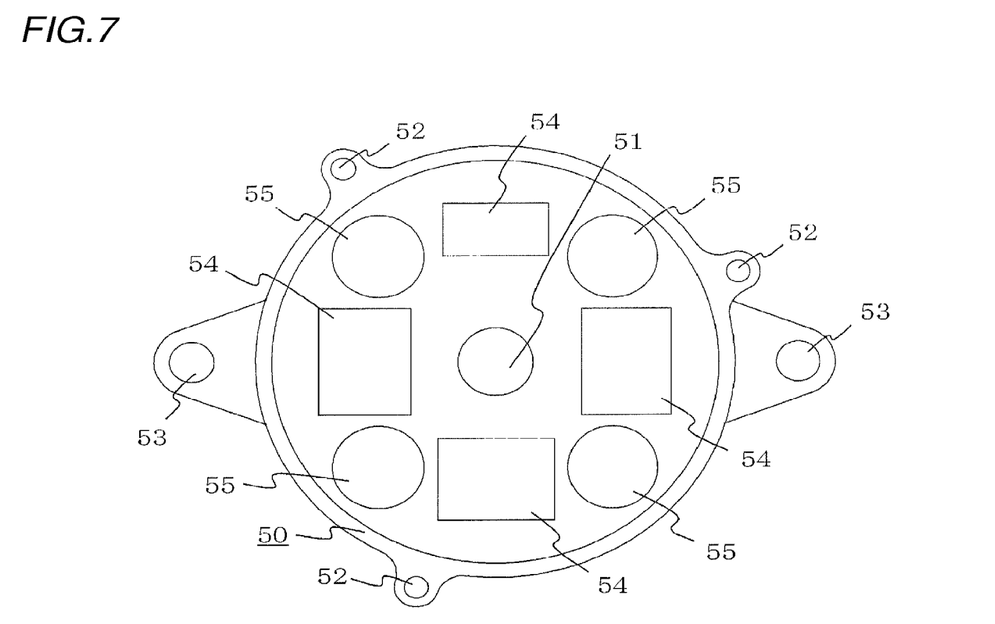
FIG. 7 is a plan view of a heat sink of the motor drive control unit according to the first embodiment of the invention.
Figure 8:
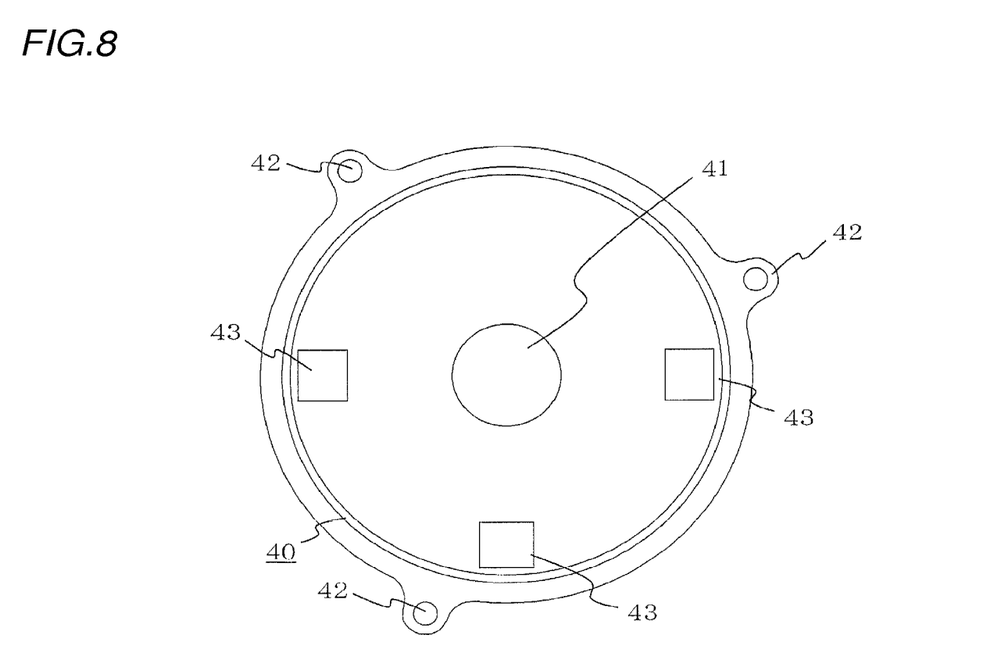
FIG. 8 is a plan view of a housing of the motor drive control unit according to the first embodiment of the invention.

The motor drive control unit 30 is formed by layering the control board 60 of FIG. 5, the electric connection portion 70, the smoothing capacitors 74, the coil 75, and the switching elements 73 of FIG. 6, the heat sink 50 of FIG. 7, and the housing 40 of FIG. 8 in the direction of the rotation shaft of the motor 10.

FIG. 5 is a plan view of the control board 60 of the motor drive control unit of the first embodiment and shows a view when the control board 60 is viewed from the rear side (the opposite side of the motor output shaft). FIG. 5 shows only a schematic view and a detailed circuit structure is omitted. The microcomputer 64 and the FET drive circuit 65 are mounted on the control board 60 and a hole 61 to let the shaft 16 of the motor 10 pass through is provided at the center. A predetermined number of holes 62 to let control signal lines pass through are provided on the periphery of the hole 61. A predetermined number of holes 63 to let terminals, which are signal lines from the connector 90, pass through are provided in an upper part facing the drawing.

The control board 60 is held by the electric connection portion 70 with screws or by soldering to control signal lines 73h.

FIG. 6 is a plan view of the electric connection portion of the motor drive control unit of the first embodiment and shows a view when the electric connection portion 70, the smoothing capacitors 74, the coil 75, and the switching elements 73 are viewed from the front side. The electric connection portion 70 is formed of a plus-side bus bar 77, a minus-side bus bar 78, and a frame 72 formed of an insulating member, such as resin. The frame 72 plays a role of holding terminals 79 which are signal lines from the bus bars 77 and 78 and the connector 90 and a role of securing electrical isolation between the foregoing members and the other members. The bus bar 77 is connected to the battery 100. It should be noted that the plus side of the battery 100 is electrically connected to the plus-side bus bar 77 via a harness and a connector electrode. The bus bar 77 is connected to one terminal of the coil 75 and connected to another plus-side bus bar again from the other terminal. Further, the bus bar 77 is disposed along a shaft insertion hole 71 and in a rectangular shape. On the other hand, the minus-side bus bar 78 is disposed on an inner side of the plus-side bus bar 77 in a rectangular shape and connected to the minus side of the battery 100 via a harness and a connector electrode.

The electric connection portion 70 is held by the heat sink 50 with screws or the like.

Further, the smoothing capacitors 74 and the switching elements 73 are connected to the plus-side bus bar 77 and the minus-side bus bar 78. Also, the power supply relay 76 is connected in series to the plus side of the coil 75. ON and OFF states of the power supply relay 76 are controlled by control signal lines 76c extending from the power supply relay 76. In FIG. 6, three smoothing capacitors 74 are provided, which are disposed at corners of the bus bars 77 and 78 disposed in a rectangular shape and connected to these bus bars. The switching terminals 73 are connected to the plus-side bus bar 77 and the minus-side bus bar 78 via plus-side terminals 73f and minus-side terminals 73g, respectively. Also, a motor-side terminal 73e is provided to each switching element 73 so as to supply a current to the motor 10. The control signal lines 73h extend from the switching elements 73 toward the control board 60.

The structure of the switching elements 73 can be a module formed by resin-molding a MOS-FET bare chip and a shunt resistor. By resin-molding the bare chip, heat generated in the switching elements 73 can be efficiently transferred to switching element placement portions of the heat sink 50. Hence, there can be achieved an advantage that a temperature rise of the switching elements 73 can be reduced. Accordingly, a temperature rise of the control board 60 and the control elements can be suppressed, too. It should be appreciated, however, that the switching elements 73 are not limited to the one described above and it goes without saying that a structure in which a bare chip is mounted on a ceramic board, for example, a DBC (Direct Bonded Copper) board, is also available.

FIG. 7 is a plan view of the heat sink of the motor drive control unit of the first embodiment and shows a view when the heat sink 50 is viewed from the rear side. The heat sink 50 of FIG. 7 has substantially a circular outer shape when viewed from the rear side and the screw holes 53 for connection to the gear side are provided at two points in an outer peripheral portion. The screw holes 53 are provided at opposing positions apart by 180 degrees or substantially 180 degrees. The screw holes 52 are provided at three points at positions away from the screw holes 53 in an axial direction. These are screw holes for connection to the housing 40 described below. In FIG. 7, these screw holes are provided at three points spaced apart by about 120 degrees. The hole 51 to let the shaft 16 of the motor 10 penetrate through is provided at the center of the heat sink 50. A total of three switching element placement portions 54 of an oblong shape are provided on the periphery of the hole 51. These switching element placement portions 54 coincide with that of FIG. 1. In order to maintain a homogeneous contact state with the switching elements 73, it is recommended that the surfaces be made flat by applying machining with accuracy. Further, circular holes 55 are provided next to the switching element placement portions 54. These holes 55 are concave portions in which to embed the smoothing capacitor 74 and the coil 75 of FIG. 1. FIG. 7 shows a case where a total of four holes are provided to embed three smoothing capacitor 74 and one coil 75.

FIG. 8 is a plan view of the housing 40 of the motor drive control unit of the first embodiment and shows a view when the housing 40 is viewed from the rear side. Screw holes 42 for connection to the frame 10 are provided at three points in a circumferential direction and positions thereof are brought into coincidence with the positions of the screw holes 52 of the heat sink of FIG. 7 in the circumferential direction. The frame 11 of the motor 10 and the housing 40 are fastened by inserting the screws 101 into the screw holes 42. A hole 41 to let the shaft 16 of the motor 10 pass through is provided in the vicinity of the center of the housing 40. Further, holes 43 to let bus bars (not shown) electrically connecting the motor 10 and the switching elements 73 pass through are provided at three points. The reason why the holes 43 are provided at three points is that the motor 10 is electrically connect to the switching elements 73 via bus bars of the respective phases U, V, and W.

Figure 9:
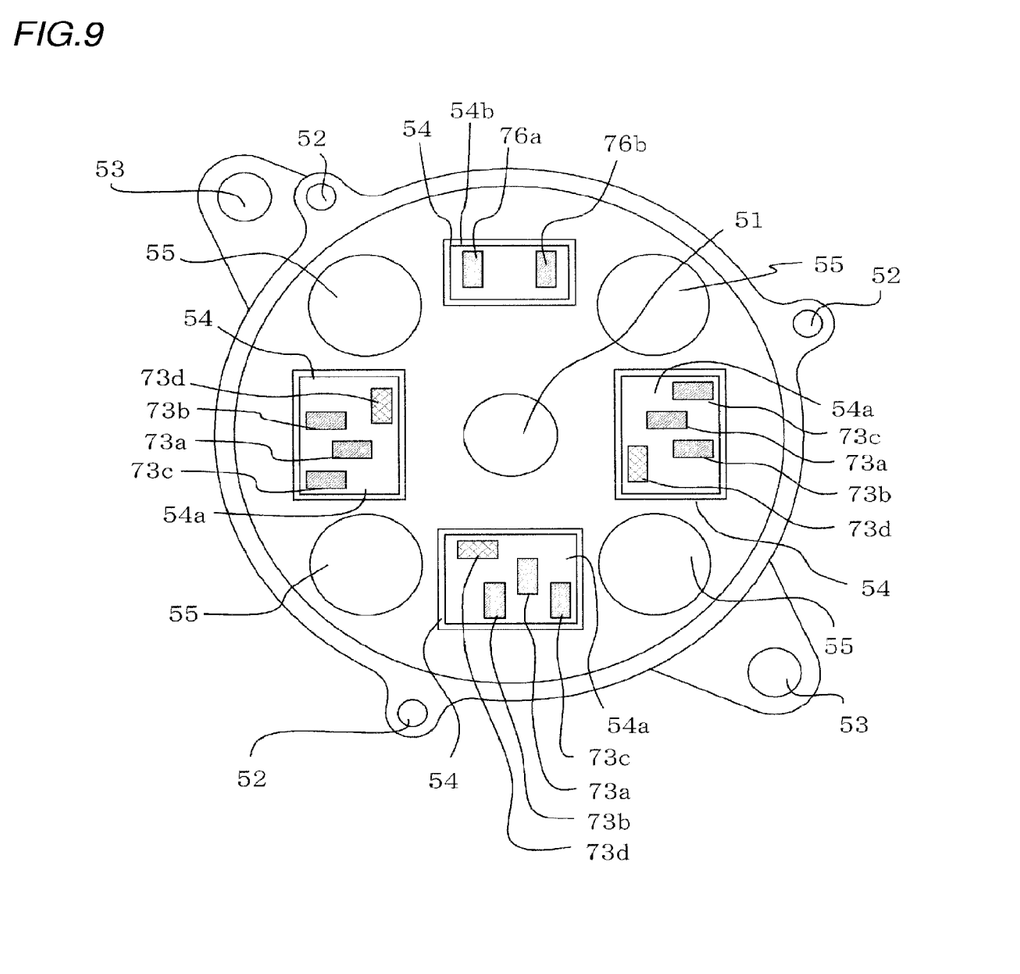
FIG. 9 is a plan view of the heat sink of the motor drive control unit according to the first embodiment of the invention when viewed from a rear side of a motor.

FIG. 9 is a plan view of the motor drive control unit of the first embodiment when the heat sink is viewed from the rear side of the motor and shows a case where ceramic boards provided with switching elements are disposed in the switching element placement portions 54 of the heat sink 50. Two FETs 76a and 76b forming one power supply relay 76 and three FETs 73a, 73b, and 73c of the respective phases forming the three-phase bridge circuit are aligned substantially on the circumference and the holes 55 (or concave portions) in which to install one coil 75 and three smoothing capacitors 74 are provided among these members. The power supply relay 76 includes a ceramic board 54b and bare chips of two FETs 76a and 76b. Each of the switching elements 73 of the three phases includes a ceramic board 54a, three FETs 73a, 73b, and 73c, and one shunt resistor 73d. It should be noted that wire bondings electrically connecting the bare chips and the shunt resistors are omitted in the drawing.

The FET 73a is disposed on a plus-side arm, the FET 73b and the shunt resistor 73d are disposed on a minus-side arm, and the FET 73c is disposed on the motor side. The FET 73c is normally in a constantly ON state and plays a role of electrically isolating the motor 10, that is, plays a role of a motor relay when the need arises. The respective switching elements of the three phases are of a common design and the cost can be therefore reduced. The ceramic boards 54a and 54b can be, for example, a DBC board (Direct Bonded Copper) or a DBA board (Direct Bonded Aluminum). When the DBC board is used, heat generated in the FETs and the shunt resistors can be efficiently released to the heat sink using a copper thin plate (aluminum thin plate in the case of the DBA board) and ceramic. Hence, a temperature rise of the FETs and the shunt resistors can be reduced. The ceramic boards 54a and 54b may be joined to the switching element placement portions 54 via an adhesive or fixed by soldering.

As has been described, there can be achieved an advantage that a temperature rise of the switching elements can be reduced because heat generated of the switching elements can be efficiently transferred to the switching element placement portions 54 by the ceramic boards 54a and 54b. A temperature rise of the control board and the control elements can be suppressed as well, which means that the motor drive control unit can be reduced in size and weight. Accordingly, the shaft length of the motor drive control unit can be shorter and the center of gravity of the motor can be moved closer to the gear side. Consequently, there can be achieved an advantage that vibration and noise can be reduced. Different from an axially long motor, there can be achieved another advantage that a space surrounding the transmission mechanism, such as a worm gear, can be effectively utilized.

Figure 10:
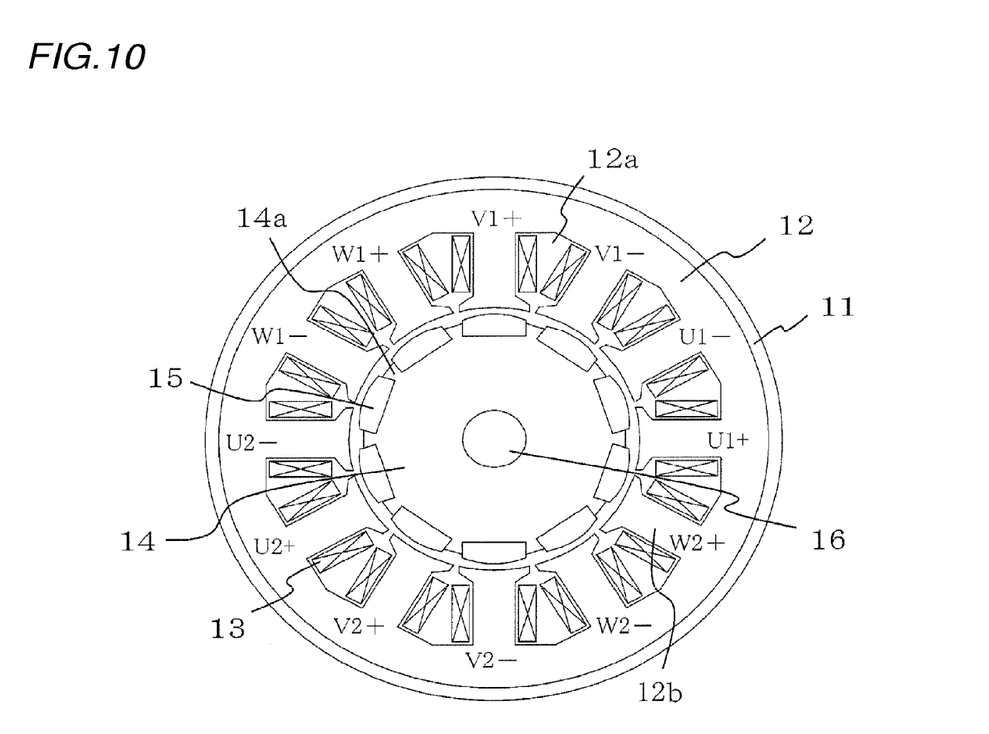
FIG. 10 is a longitudinal cross section of the motor according to the first embodiment of the invention.

FIG. 10 is a longitudinal cross section of the motor 10. In this cross section, a permanent magnet 15 is laminated on the surface of the rotor iron core 14 and has 10 poles in this case. Further, the permanent magnet 15 has a barrel-shaped cross section and reduces torque pulsations by reducing harmonic components of a magnetic flux and shaping an inductive voltage into a sinusoidal waveform. The rotor iron core 14 is provided with protrusions 14a and plays a role of fixing the permanent magnet 14 so as not to slide in the circumferential direction. Meanwhile, the stator iron core 12 is provided with slots 12a to wind the armature winding 13. FIG. 10 shows a case where the armature winding 13 is intensively wound around radially extending teeth 12b of the stator iron core 12. Herein, the number of the slots is 12 and the armature winding is wound around all of the 12 teeth.

Further, the number of phases of this permanent magnet rotating electrical machine is three. Let the three phases be a phase U, a phase V, and a phase W. Then, as is shown in FIG. 10, the windings are arranged as follows: U1 +, U1 −, V1 −, V1 +, W1 +, W1 −, U2 −, U2 +, V2 +, V2 −, W2 −, and W2 +. Herein, signs + and − denote winding directions and the signs + and − indicate that the winding directions are opposite to each other. Further, U1 + and U1 − are connected in series and U2 − and U2 + are also connected in series. These two series circuits can be connected either in parallel or in series. The same applies to the phase V and the phase W. Further, the three phases can be either wye-connected or delta-connected. The 10-pole and 12-slot motor has a large fundamental winding factor and a small harmonic winding factor and therefore becomes a motor with a high torque and a low torque pulsation. Hence, because the motor 10 can be more compact and the axial length of the motor 10 can be shorter, the center of gravity of the motor 10 can be moved closer to the gear side. Consequently, there can be achieved an advantage that vibration and noise can be reduced.

FIG. 10 shows a case of the 10-pole and 12-slot motor. It should be appreciated, however, that the motor 10 is not limited to this case. Let M be the number of poles and N be the number of slots. Then, when a relational expression between M and N expressed as: 0.75<N/M<1.5, is established, a winding factor is high in comparison with a case where N/M=0.75 or N/M=1.5 and a compact and high-torque permanent magnet rotating electrical machine can be obtained by efficiently using a magnetic flux of the permanent magnet.

For example, the same advantage can be achieved with a 14-pole and 12-slot (M=14 and N=12) motor and a 14-pole and 18-slot (M=14 and N=18) motor.

As has been described, a motor drive device for electric power steering apparatus according to the first embodiment of the invention is the motor drive device for electric power steering apparatus, including the motor 10 having the stator iron core 12, the frame 11 fixing the stator iron core, and the rotor iron core 14 fixed to the shaft 16 supported in a rotatable manner, and the motor drive control unit 30 disposed coaxially with the shaft and combined with the motor 10 into one piece. It is configured in such a manner that: at least two screw holes 53 for fixation to the gear (speed reducer) of the electric power steering apparatus are provided to either one of the motor drive control unit 30 and the motor 10; and let L1 be a maximum value of a distance between center points of the screw holes, and L2 be a distance between an end face D of the stator iron core in an axial direction on a farther side from the gear and an attachment surface C attached to a gear side, then a value of L1 is equal to or greater than a value of L2.

The motor drive device for electric power steering apparatus according to the first embodiment of the invention configured as above achieves the following advantages.

The motor drive device is of an integral-type configuration that combines the coaxially disposed motor drive control unit 30 and yet can be shaped flat and shorter in the axial direction than the apparatus in the related art. Hence, there can be achieved an advantage that not only can a space surrounding the gear be utilized effectively, but also ease of mounting can be enhanced. Further, in spite of the integral-type configuration that combines the coaxially disposed motor drive control unit 50, positions of the center of gravity of the stator iron core 12 and the rotor iron core 14 both having a large mass can be moved closer to the gear. Hence, there can be achieved an advantage that vibration and noise can be reduced. FIGS. 1 through 3 show a case where the screw holes 53 are provided at two points. It should be appreciated, however, that the invention is not limited to this case. In a case where the screw holes 53 are provided to three points or more than three points in the circumferential direction, the same advantage can be achieved by defining a longest distance among the center points of these screw holes 53 as L1.

Further, it is configured in such a manner that the motor drive control unit 30 is disposed on the side of the gear when viewed from the motor 10, and that let L3 be a total of axial lengths of the heat sink 50 and the housing 40 and L4 be a length of the frame 11 of the motor 10, then a value of L3 is equal to or greater than a value of L4.

When configured in this manner, the center of gravity can be moved closer to the gear by making a portion of the stator iron core 12 and the rotor iron core 14 in the motor 10 flat. Hence, there can be achieved an advantage that vibration and noise can be reduced.

The motor drive control unit 30 is disposed on the side of the gear when viewed from the motor 10 and the heat sink 50 is disposed on the side of the gear.

When configured in this manner, the center of gravity of the motor 10 and the motor drive control unit 30 can be moved closer to the gear by disposing the heat sink 50 accounting for a large proportion of mass in the motor drive control unit 50 on the side closer to the gear. Hence, there can be achieved an advantage that vibration and noise can be reduced.

In the motor drive control unit 30, the switching elements 73 are disposed in the switching element placement portions 54 that are combined with the heat sink 50 into one piece or provided separately. Also, the heat sink 50 is disposed on the front side.

When configured in this manner, there can be achieved an advantage that not only can vibration and noise be reduced because the center of gravity can be moved closer to the gear, but also a continuous steering time of the electric power steering apparatus can be longer at the same time because heat generated in the switching elements 73 can be released efficiently to the gear side and hence a temperature rise can be reduced.

The motor drive control unit 30 has the smoothing capacitors 74 and the coil 75, and the smoothing capacitors 74 and the coil 75 are embedded in the holes 55 provided to the heat sink 50.

When configured in this manner, the smoothing capacitors 74 and the coil 75 are embedded into the holes of the heat sink. Hence, there can be achieved an advantage that not only can a size be reduced because the axial length can be shorter, but also vibration and noise can be reduced at the same time because the center of gravity can be moved to a position closer to the gear.

Herein, let M be the number of poles and N be the number of slots of the armature of the motor 10, then a relational expression below is established for M and N:

$$0.75 < N/M < 1.5.$$

When configured in this manner, a winding factor is high in comparison with a case where N/M=0.75 or N/M=1.5 and a compact and high-torque permanent magnet rotating electrical machine can be obtained by efficiently using a magnetic flux of the permanent magnet 15. Hence, there can be achieved an advantage that not only can a size be reduced because a motor having the stator iron core 12 with a short shaft length can be provided, but also vibration and noise can be reduced at the same time because the center of gravity can be moved to a position closer to the gear.

The rotation sensor 80 that detects a rotation position of the motor 10 is embedded in the heat sink 50 of the motor drive control unit 30. Hence, there can be achieved an advantage that not only can a size be reduced because the axial length can be shorter, but also vibration and noise can be reduced at the same time because the center of gravity can be moved to a position closer to the gear.

It has been described that an aluminum die casting material is suitable for the housing 40 of the motor drive control unit 30. However, the housing 40 may be made of resin either in part or in whole. In a case where the housing 40 is made of resin, there can be achieved an advantage that vibration-induced displacement can be suppressed due to a weight reduction and transmission of vibration is suppressed due to attenuation by the resin in comparison with a case where the housing 40 is made of metal, such as an aluminum die casting material.

Second Embodiment

Figure 11:
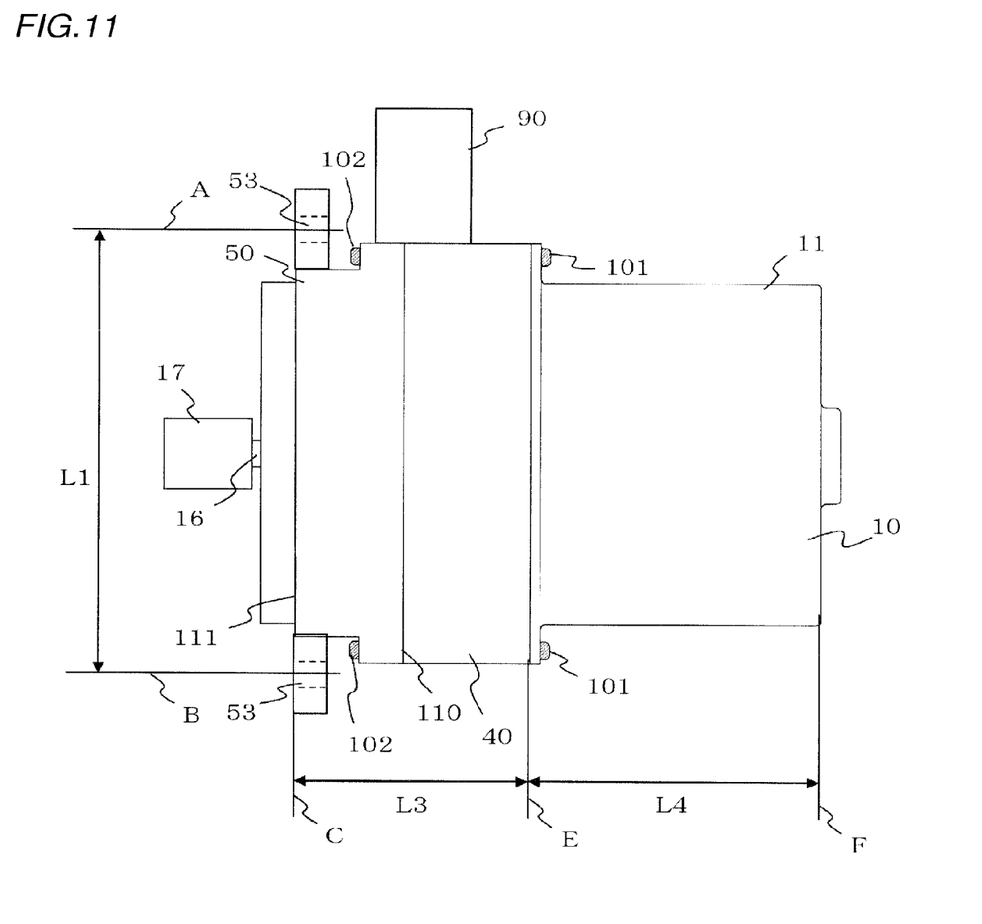
FIG. 11 is an outward appearance view of a motor drive device according to a second embodiment of the invention.

FIG. 11 is an outward appearance view of a motor drive device according to a second embodiment of the invention and shows an outward appearance of a motor drive control unit 30 disposed on the front side of a motor and combined with the motor into one piece and the motor 10. A frame 11 of the motor 10 is fixed to a housing 40 of the motor drive control unit 30 with screws 101. Further, the housing 40 and a heat sink 50 are fixed with screws 102. A difference from FIG. 2 is the orientation of a connector 90. In FIG. 2, the connector 90 extends rearward of the motor 10 whereas FIG. 11 shows a case where the connector 90 extends in a radial direction of the motor 10 and an insertion direction is the radial direction. There is an advantage that a space surrounding the motor 10 in the radial direction can be utilized effectively and ease of mounting can be enhanced.

Third Embodiment

Figure 12:
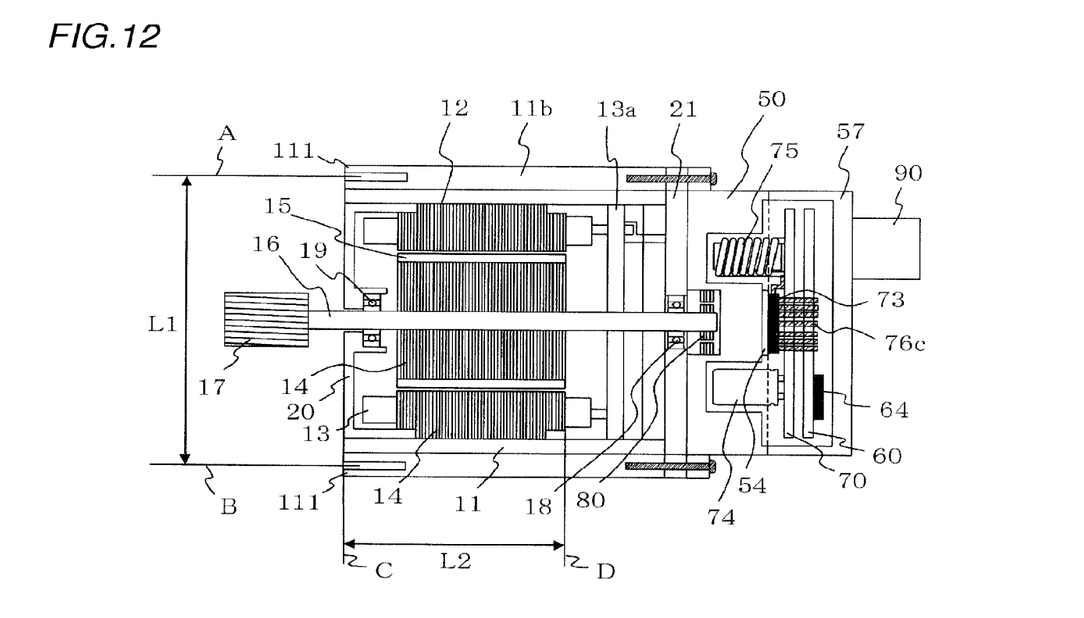
FIG. 12 is a schematic cross section of a motor drive device according to a third embodiment of the invention.

FIG. 12 is a schematic cross section of a motor drive device of a third embodiment and shows a case where a motor drive control unit is disposed on a side (rear side of the motor) opposite to the gear side (the speed reducer side) of the electric power steering apparatus and combined with the motor into one piece. An armature winding 13 is wound around a stator iron core 12 and a rotor including a rotor iron core 14 and a permanent magnet 15 is disposed oppositely to the stator iron core 12. A shaft 16 is press-fit into the center of the rotation shaft of the rotor iron core 14 and a boss 17, which is a coupling to a shaft of the gear of the electric power steering apparatus, is press-fit to one end of the shaft 16. The shaft 16 has a structure by which the shaft 16 is supported on two bearings and allows the rotor to rotate. A bearing 19 disposed on the gear side (front side) when viewed from the motor 10 is fixed to a cover 20 disposed on the gear side (front side) of the stator iron core 12. On the other hand, a bearing 18 disposed on the rear side is fixed to a cover 21 disposed on the rear side. The stator iron core 12 is fixed to the frame 11 by press-fitting or shrink fitting. Protrusions 11b in which to provide screw holes are provided to to the frame 11 in a full axial length of the frame 11. This shape can be formed by extrusion of aluminum. A rotation sensor 80 is provided at an end of the shaft 16 on the rear side. In FIG. 12, a variable reluctance resolver is installed. It should be appreciated, however, that the rotation sensor 80 is not limited to the variable reluctance resolver and it goes without saying that a magnetic sensor as a combination of a permanent magnet and a GMR or an MR element is also available.

The motor drive control unit 30 includes a control board 60 on which a microcomputer 64 is mounted and includes, on the side of the motor 10 when viewed from the control board 60, an electric connection portion 70 electrically connecting a coil 75 and smoothing capacitors 74. Switching elements 73 are installed in switching element placement portions 54 and further a heat sink 50 combined with (or provided separately from) the switching element placement portions 54 is provided. The heat sink 50 is provided with holes in which the smoothing capacitors 74 and the coil 75 are embedded. The motor drive control unit 30 is covered with a cover 57 made of metal or resin. A connector 90 is provided behind the cover 57 to supply a power supply from a battery 100, a signal from the torque sensor and a signal of a vehicle speed.

The cover 57 is fixed to the heat sink 50 with an adhesive or screws or a combination of an adhesive and screws.

The frame 11 of the motor 10 is provided with the protrusions 11b in the radial direction and screw holes 11c for motor drive control unit fixation and screw holes 11d for gear fixation are formed in the protrusions 11b. Let L1 be a distance between center positions the screw holes 11d for gear fixation, that is, a distance between straight lines A and B, C be an abutment surface to the gear, D be an end face of the rotor iron core 12 on the rear side, and L2 be a distance between the plane C and the plane D. Then, it is structured in such a manner that a value of L1 is equal to or greater than a value of L2. Among the motor constituent components, the stator iron core 12 of the motor 10 accounts for a large proportion of mass. Hence, the position of the center of gravity of the motor 10 largely depends of the position of the stator iron core 12. Further, the rotor iron core 14 has a large mass, too. However, it is configured in such a manner that an end face of the stator iron core 12 in the axial direction and an end face of the rotor iron core in the axial direction coincide or substantially coincide with each other. Hence, by setting the value of L1 to be equal to or greater than the value of L2, the position of the center of gravity of the motor 10 can be moved closer to the gear side.

When configured as above, the position of the center of gravity of the motor 10 can be moved closer to the gear side. Hence, there can be achieved an advantage that not only can vibration and noise be reduced but also the device can be reduced in size. Also, a degree of freedom of a sectional shape is increased by forming the frame 11 by extrusion. Hence, there can be achieved an advantage that it is easy to mold the frame 11 with a sectional shape in consideration of the layout with respect to the gear. Further, the center of gravity can be moved further forward than by disposing the motor drive control unit 30 on the gear side (front side). Hence, the advantage of reducing vibration and noise can be enhanced.

Also, because the heat sink 50 is provided on the front side of the motor drive control unit 30, the heat sink 50 having a large mass among the constituent components is disposed on a side closer to the gear. Hence, because the center of gravity can be moved to a position closer to the gear, there can be consequently achieved an advantage that vibration and noise can be reduced.

Fourth Embodiment

Figure 13:
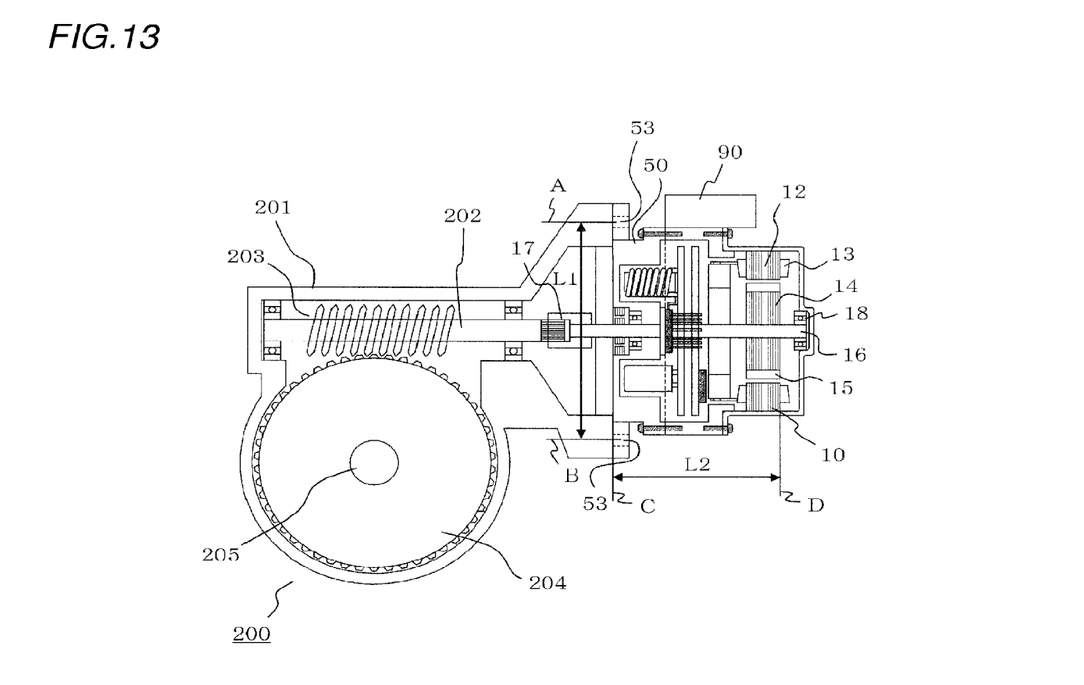
FIG. 13 is a schematic cross section of a motor drive device according to a fourth embodiment of the invention.

FIG. 13 is a schematic cross section of a motor drive device of a fourth embodiment and shows a case where the motor drive device is attached to a column electric power steering apparatus. A heat sink 50 is fixed by abutting on a housing 201 of a gear (speed reducer) 200 with screws (not shown). A boss 17 is connected to a worm gear shaft and a torque of the motor 10 is transmitted to a worm gear shaft 202 to turn the worm gear shaft 202. Further, a worm gear 203 rotates a worm wheel 204 and a steering shaft 205 mechanically connected to the worm wheel 204. Two screw holes 53 for attachment to the gear 200 are provided. Let L1 be a distance between the screw holes 53 and L2 be a distance between an abutment surface to the gear 200 and an end face of the stator iron core 12 in the axial direction on a farther side from the gear 200. Then, a value of L1 is equal to or greater than a value of L2.

Owing to the configuration as above, the center of gravity of the motor 10 can be moved to a side closer to the gear. Hence, even when the motor 10 is vibrated in the radial direction, displacement is suppressed to a small extent. Consequently, there can be achieved an advantage that vibration and noise can be reduced.

REFERENCE SIGNS LIST

10: motor
11: frame, 11a: screw hole, 11b: protrusion, 11c and 11d: screw hole
12: stator iron core, 12a: slot, 12b: teeth
13: armature winding, 13a: terminal
14: rotor iron core, 14a: protrusion
15: permanent magnet
16: shaft
17: boss
18 and 19: bearing
20 and 21: cover
30: motor drive control unit
40: housing
41: shaft insertion hole
42: screw hole for heat sink connection
43: bus bar insertion hole
50: heat sink
51: shaft insertion hole
52: screw hole for housing connection
53: screw hole for gear-side connection
54: switching element placement portion, 54a and 54b: ceramic board
55: smoothing capacitor and coil housing hole
56: flange portion
57: cover
58: hole
60: control board
61: shaft insertion hole
62: control signal line insertion hole
63: terminal insertion hole
64: microcomputer
65: FET drive circuit
70: electric connection portion
71: shaft insertion hole
72: frame
73: switching element, 73a, 73b, and 73c: FET 73d: shunt resistor, 73e: motor-side terminal, 73f: plus-side terminal
73g: minus-side terminal, 73h: control signal line
74: smoothing capacitor
75: coil
76: power supply relay, 76a and 76b: FET, 76c: control signal line
77: plus-side bus bar
78: minus-side bus bar
79: terminal
80: resolver (rotation sensor)
90: connector, 90a: power supply connector, 90b: control connector
100: battery
101: screw for frame and housing connection
102: screw for housing and heat sink connection
110: abutment surface of housing and heat sink
111: abutment surface of gear and heat sink
200: gear (speed reducer)
201: housing
202: worm gear shaft
203: worm gear
204: worm wheel
205: steering shaft

The invention claimed is:

1. A motor drive device for electric power steering apparatus, including a motor having a stator iron core, a frame fixing the stator iron core, and a rotor iron core fixed to a shaft supported in a rotatable manner, and a motor drive control unit disposed coaxially with the shaft and combined with the motor into one piece, characterized in that:
at least two screw holes for fixation to a gear (speed reducer) of the electric power steering apparatus are provided to either one of the motor drive control unit and the motor; and
let L1 be a maximum value of a distance between center points of the screw holes, and L2 be a distance between an end face of the stator iron core in an axial direction on a farther side from the gear and an attachment surface attached to a gear side, then a value of L1 is equal to or greater than a value of L2.

2. The motor drive device for electric power steering apparatus according to claim 1, characterized in that:
the motor drive control unit includes a heat sink on which is mounted a switching element that controls driving of the motor and a housing connected to the heat sink so as to cover the switching element.

3. The motor drive device for electric power steering apparatus according to claim 2, characterized in that:
the motor drive control unit is disposed on a side of the gear when viewed from the motor; and
let L3 be a total of axial lengths of the heat sink and the housing and L4 be a length of a frame of the motor, then a value of L3 is equal to or greater than a value of L4.

4. The motor drive device for electric power steering apparatus according to claim 2, characterized in that:
the motor drive control unit is disposed on a side of the gear when viewed from the motor and the heat sink is disposed on the side of the gear.

5. The motor drive device for electric power steering apparatus according to claim 2, characterized in that:
in the motor drive control unit, the switching element is disposed in a switching element placement portion that is combined with the heat sink into one piece or provided separately.

6. The motor drive device for electric power steering apparatus according to claim 2, characterized in that:
the motor drive control unit has a smoothing capacitor for ripple absorption and a coil for noise absorption; and
the smoothing capacitor and the coil are embedded in holes provided to the heat sink.

7. The motor drive device for electric power steering apparatus according to claim 1, characterized in that:
let M be the number of poles and N be the number of slots of an armature of the motor, then a relational expression below is established for M and N, $0.75 < N/M < 1.5$.

8. The motor drive device for electric power steering apparatus according to claim 2, characterized in that:
a rotation sensor that detects a rotation angle of the motor is embedded in the heat sink.

9. The motor drive device for electric power steering apparatus according to claim 2, characterized in that:
the housing is made of resin either in part or in whole.

10. The motor drive device for electric power steering apparatus according to claim 1, characterized in that:
the motor drive control unit has a connector to electrically connect the motor and the switching element; and
the connector extends in a radial direction of the motor and an insertion direction thereof is the radial direction of the motor.

11. The motor drive device for electric power steering apparatus according to claim 1, characterized in that:
the motor drive control unit is disposed on a farther side from the gear when viewed from the motor.

12. The motor drive device for electric power steering apparatus according to claim 11, characterized in that:
the heat sink is disposed on the side of the gear in the motor drive control unit.

13. The motor drive device for electric power steering apparatus according to claim 1, characterized in that:
a housing of the gear is fixed to the screw holes and a worm gear shaft forming the gear is connected to the shaft of the motor.

* * * * *